United States Patent [19]

Vafa et al.

[11] Patent Number: 5,235,016
[45] Date of Patent: Aug. 10, 1993

[54] COMPOSITION COMPRISING AN EMULSION COPOLYMER OF ALKYLACRYLAMIDO GLYCOLATE ALKYLETHER, VINYL ACETATE AND A HYDROXY FUNCTIONAL MONOMER, AND PROCESS FOR PREPARING THE SAME

[75] Inventors: Abdol-Manaf Vafa, Rotterdam; Erik Saly, Spijenisse, both of Netherlands

[73] Assignee: American Cyanamid Company, Stamford, Conn.

[21] Appl. No.: 735,499

[22] Filed: Jul. 25, 1991

[51] Int. Cl.$^5$ ............................................. C08F 20/58
[52] U.S. Cl. ........................................ 526/304; 525/59; 527/314
[58] Field of Search ................ 526/304; 525/59; 527/314

[56] References Cited

U.S. PATENT DOCUMENTS

| 4,521,563 | 6/1985 | Lucas | 526/304 |
| 4,522,973 | 6/1985 | Ley et al. | 526/304 |
| 4,528,320 | 7/1985 | Ley et al. | 526/304 |
| 4,530,960 | 7/1985 | Ley et al. | 526/304 |
| 4,778,869 | 10/1988 | Schirmann et al. | 526/304 |
| 4,844,970 | 7/1989 | Goldstein et al. | 526/304 |
| 4,900,624 | 2/1990 | Chen | 526/304 |
| 4,902,569 | 2/1990 | Chen | 526/304 |
| 5,039,764 | 8/1991 | Steinwand | 526/304 |

FOREIGN PATENT DOCUMENTS

| 61-179267 | 8/1986 | Japan | 526/304 |
| 2202857 | 10/1988 | United Kingdom | 526/304 |

Primary Examiner—Christopher Henderson, Jr.
Assistant Examiner—N. Sarofim
Attorney, Agent, or Firm—Frank M. Van Riet

[57] ABSTRACT

The invention relates to a composition comprising an emulsion copolymer of an alkyl acrylamido glycolate alkylether, vinyl acetate, and a functional hydroxide containing monomer, a process for its preparation as well as its use as binder, coating, or adhesive, in particular as a self-crosslinking binder composition. The preferred alkyl acrylamido glycolate alkylether is methylacrylamido glycolate methylether (MAGME ®).

5 Claims, No Drawings

COMPOSITION COMPRISING AN EMULSION COPOLYMER OF ALKYLACRYLAMIDO GLYCOLATE ALKYLETHER, VINYL ACETATE AND A HYDROXY FUNCTIONAL MONOMER, AND PROCESS FOR PREPARING THE SAME

The invention relates to a composition an emulsion copolymer of at least an alkylacrylamido glycolate alkylether, vinylacetate and a functional hydroxy containing monomers.

In particular, the present invention relates to a specific use of alkylacrylamido glycolate alkylethers having the formula.

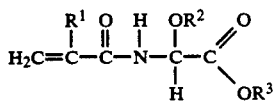

wherein $R^1$ or methyl, preferably hydrogen; $R^2$ and $R^3$ are independently selected from $C_1$–$C_6$ alkyl and $C_5$–$C_6$ cycloalkyl, preferably $C_1$–$C_4$ alkyl.

The use of said glycolate ethers having the formula (I) in the field of polymers is generally known, e.g. from U.S. Pat. No. 4,522,973. This reference relates to a low temperature cross-linkable emulsion of a polymer containing repeating units derived from the monomer having the formula (I) and a cross-linking agent having a plurality of primary amine groups. Repeating units of unsaturated comonomers may be present too, e.g. alkylesters of acrylic and methacrylic acid, styrene, vinylacetate, butadiene, ethylene, cyclopentadiene, acrylonitril and vinylchloride. A preferred compound having the formula (I) is methylacrylamido glycolate methylether (MAGME) available from American Cyanamid Co.. A serious drawback of the emulsion polymers of this reference is the use of a two-pack system. Furthermore, amine cure is required. For, it appeared that complete self-crosslinking will not occur on heating. According to the examples relatively high levels of MAGME are required. In addition, the use of monomers having hydroxy functionality is not mentioned.

EP-A-0 302 588 discloses formaldehyde free binder compositons formed by polymerization of compounds having the formula (I) and a comonomer such as acrylic and methacrylic acid (or esters thereof), styrene, vinylesters such as vinylacetate etc., wherein said composition also contains a reactive function such as hydroxy, carboxy, and amino. In the examples MAGME is used, however not in combination with vinylacetate.

EP-A-0 218 827 relates to formaldehyde free polymers in which the compounds having the formula (I) may be used. It is stated that "acryl amide/glyoxylic condensates and their ethers and esters have been used. These materials have not performed well in applications with vinylacetate-ethylene emulsions....".

The use of compounds having the formula (I) is further described in e.g. U.S. Pat. No. 4,743,498 (Kedrowski), U.S. Pat. No. 4,454,301 (Cady), U.S. Pat. No. 4,778,869 (Schirmann), U.S. Pat. No. 4,656,308 (Schirmann), U.S. Pat. No. 4,689,264 (Fink).

In the leaflet "MAGME* 100, multifunctional acrylic monomer" available from American Cyanamid Company, Polymer Products Division, One Cyanamid Plaza, Wayne, N.J. 07470, U.S.A. the properties and applications of MAGME have been summarized. On page 5 of this leaflet the following table is given:

| Copolymerization parameters of MAGME with various vinyl monomers | | | |
|---|---|---|---|
| Monomer I | Monomer II | $r_1$ | $r_2$ |
| MAGME | Styrene | 0.21 ± .3 | 0.36 ± .4 |
| | Acrylonitrile | 0.66 ± .32 | 0.67 ± .24 |
| | Methyl Methacrylate | 1.27 ± .32 | 0.95 ± .20 |
| | Butyl Acrylate | 3.10 ± .19 | 1.03 ± .04 |
| | Ethyl Acrylate | 3.26 ± .25 | 0.78 ± .04 |
| | Vinyl Acetate | 38.2 ± 3.2 | 0.10 ± .03 |

On the basis of the above copolymerization parameters on average expert in the field of emulsion copolymerization would refrain from using MAGME in combination with vinylacetate.

According to the present invention of composition comprising a copolymer of a compound having the formula (I), vinylacetate and at least one other functional hydroxy containing monomer having surprising properties is provided. Various drawbacks of the prior art are overcome by the present invention.

The present invention relates to a composition comprising a copolymer of
a) 0.1–25% by wt. of an alkyl acrylamidoglycolate alkylether having the formula

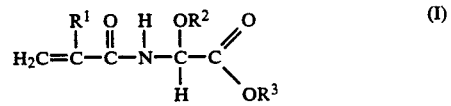

wherein
$R^1$ is hydrogen or methyl, preferably hydrogen;
$R^2$ and $R^3$ are independently selected from $C_1$–$C_6$ alkyl and $C_5$–$C_6$ cycloalkyl, preferably $C_1$–$C_4$ alkyl;
b) 50–95% by wt. of vinylacetate;
c) 0.1–25% by wt. of functional hydroxy containing monomer;
d) 0–50% by wt of another vinyl monomer, the amounts of the components a)–d) being calculated on the weight of the total composition.

Preferably, the composition according to the invention comprises
0.5–10% by wt. of component a);
80–90% by wt. of component b);
0.5–10% by wt. of component c);
5–20% by wt. of component d);
the amounts of the components a)–d) being calculated on the weight of the total composition.

In particular, in the composition according to the invention component a) is methylacrylamidoglycolate methylether (MAGME); component c) is 2-hydroxyethylacrylate (2EHA) and/or hydroxyethylmethacrylate (HEMA) or another external hydroxy containing compound selected from polyol, polyvinylalcohol and cellulosic compounds; component d) is an alkylester of acrylic or methacrylic or maleic acid such as butylacrylate (BA), methylmethacrylate (MMA), dibutylmaleate (DBM), vinylchloride, vinylidene chlorie, butadiene, ethylene and/or propylene.

Surprising and important properties of the composition according to the present invention are:
free formaldehyde system, high solvent and water resistance of the cured product, good adhesion to substrates such as polyester, excellent gloss.

Because component a) (e.g. MAGME) is not prepared from compounds derived from formaldehyde, the possibility of formaldehyde emission from the crosslinked film under acid and cure conditions is eliminated.

It is well-known in the art the that vinylacetate (component b) is hydrophilic and that vinylacetate copolymers have poor resistance to water and solvents. Therefore it is suprising that the composition according to the invention, which consists for the larger part of vinylacetate units, is solvent resistant. The films of the composition according to the invention have a very short cure time, e.g. 5 minutes/130° C. at pH 1.5–3.

The process for copolymerization the monomers in order to obtain a composition according to the invention requires gradual addition of component a) (power feed addition) in such a way that homopolymerization of MAGME is avoided. The rate of addition is determined and calculated using the reactivity parameters. In case MAGME is used as component a), the rate of addition of MAGME is calculated with the reactivity ratio's $r_1$ and $r_2$ and their concentrations in the monomer mixture. The addition system corresponds to the following power feed calculation, on which the data in tables A, B, and C are based.

$$\text{ratio} = \frac{M1 - M1 * \delta t * Va/A + M1b * \delta t * Vb/BO}{M2 - M2 * \delta t * Va/A + M2b * \delta t * Vb/BO}$$

$$\frac{\delta m1}{\delta m2} = \frac{M1 * (r1 * M1 + M2)}{M2 * (r2 * M2 + M1)}$$

$$\frac{\delta m1}{\delta m2} = \frac{\text{amount of MAGME entering polymer}}{\text{amount of VA entering polymer}}$$

where:
M1 = amount of MAGME in feed A (g) or (mol)
M1b = amount of MAGME in feed B (g) or (mol)
M2 = amount of VA in feed A (g) or (mol)
M2b = amount of VA in feed B (g) or mol)

A = content of feed A (g)
BO = original content of feed B (g)

Va = addition speed of feed A (g/min)
Vb = addition speed of feed B (g/min)

$\delta t$ = time interval used for calculation (min)

Column "MAGME" lists the total amount of MAGME added to the reactor. r1 and r2 are the copolymerization parameters for the MAGME/VA system.

TABLE A

COPOLYMERIZATION CALCULATIONS OF 1% MOLAR MAGME IN VA

1 = MAGME  2 = VA
r1 = 38.2  r2 = .1
m1a = .00751 moles  m1b = .0173 moles
m2a = .5 moles  m2b = 1.5 moles
a = 51 g charge  b = 157 g charge

| time | magme | ratio | dm1/dm2 |
|---|---|---|---|
| 0 |  | 0.015020 | 0.20551 |
| 5 | .143931 | 0.0156 | 0.20047 |
| 10 | .2848026 | 0.0146 | 0.19575 |
| 15 | .4228076 | 0.0146 | 0.19133 |
| 20 | .5581321 | 0.0146 | 0.18721 |
| 25 | .690956 | 0.0146 | 0.18338 |
| 30 | .8214523 | 0.0136 | 0.17981 |
| 35 | .9497881 | 0.0136 | 0.17651 |
| 40 | 1.076124 | 0.0136 | 0.17346 |
| 45 | 1.200613 | 0.0136 | 0.17065 |
| 50 | 1.323403 | 0.0136 | 0.16806 |
| 55 | 1.444636 | 0.0136 | 0.16570 |
| 60 | 1.564446 | 0.0126 | 0.16354 |
| 65 | 1.682962 | 0.0126 | 0.16158 |
| 70 | 1.800307 | 0.0126 | 0.15981 |
| 75 | 1.916596 | 0.0126 | 0.15822 |
| 80 | 2.031938 | 0.0126 | 0.15679 |
| 85 | 2.146438 | 0.0126 | 0.15552 |
| 90 | 2.260193 | 0.0126 | 0.15439 |
| 95 | 2.373294 | 0.0126 | 0.15341 |
| 100 | 2.485825 | 0.0126 | 0.15255 |
| 105 | 2.597866 | 0.0126 | 0.15182 |
| 110 | 2.709489 | 0.0126 | 0.15119 |
| 115 | 2.820762 | 0.0126 | 0.15066 |
| 120 | 2.931744 | 0.0126 | 0.15023 |
| 125 | 3.042492 | 0.0126 | 0.14987 |
| 130 | 3.153053 | 0.0126 | 0.14959 |
| 135 | 3.263471 | 0.0126 | 0.14938 |
| 140 | 3.373782 | 0.0126 | 0.14922 |
| 145 | 3.484019 | 0.0126 | 0.14911 |
| 150 | 3.594208 | 0.0126 | 0.14903 |
| 155 | 3.704368 | 0.0126 | 0.14899 |
| 160 | 3.814514 | 0.0126 | 0.14897 |
| 165 | 3.924656 | 0.0126 | 0.14897 |
| 170 | 4.034798 | 0.0126 | 0.14897 |
| 175 | 4.14494 | 0.0126 | 0.14897 |

TABLE B

COPOLYMERIZATION CALCULATIONS OF 2% MOLAR MAGME IN VA

1 = MAGME  2 = VA
r1 = 38.2  r2 = .1
m1a = .015 moles  m1b = 0347 moles
m2a = .5 moles  m2b = 1.5 moles
a = 53 g charge  b = 163 g charge

| time | magme | ratio | dm1/dm2 |
|---|---|---|---|
| 0 |  | 0.030000 | 0.49523 |
| 5 | .2873765 | 0.0296 | 0.48259 |
| 10 | .5687466 | 0.0296 | 0.47075 |
| 15 | .844879 | 0.0286 | 0.45968 |
| 20 | 1.114966 | 0.0286 | 0.44936 |
| 25 | 1.380532 | 0.0276 | 0.43976 |
| 30 | 1.641527 | 0.0276 | 0.43085 |
| 35 | 1.898277 | 0.0276 | 0.42259 |
| 40 | 2.151098 | 0.0266 | 0.41496 |
| 45 | 2.400291 | 0.0266 | 0.40794 |
| 50 | 2.646146 | 0.0266 | 0.40149 |
| 55 | 2.88894 | 0.0256 | 0.39559 |
| 60 | 3.128938 | 0.0256 | 0.39021 |
| 65 | 3.366392 | 0.0256 | 0.38533 |
| 70 | 3.601542 | 0.0246 | 0.38091 |
| 75 | 3.834615 | 0.0246 | 0.37694 |
| 80 | 4.065828 | 0.0246 | 0.37338 |
| 85 | 4.295384 | 0.0246 | 0.37021 |
| 90 | 4.523473 | 0.0246 | 0.36742 |
| 95 | 4.750275 | 0.0246 | 0.36497 |
| 100 | 4.975956 | 0.0246 | 0.35283 |
| 105 | 5.200672 | 0.0236 | 0.36100 |
| 110 | 5.424566 | 0.0236 | 0.35944 |
| 115 | 5.647769 | 0.0236 | 0.35812 |
| 120 | 5.8704 | 0.0236 | 0.35704 |
| 125 | 6.092567 | 0.0236 | 0.35616 |
| 130 | 6.314368 | 0.0236 | 0.35546 |
| 135 | 6.535885 | 0.0236 | 0.35493 |
| 140 | 6.757193 | 0.0236 | 0.35453 |
| 145 | 6.978354 | 0.0236 | 0.35425 |
| 150 | 7.199419 | 0.0236 | 0.35407 |

TABLE B-continued

COPOLYMERIZATION CALCULATIONS OF 2%
MOLAR MAGME IN VA

1 = MAGME         2 = VA
r1 = 38.2         r2 = .1
m1a = .015 moles  m1b = 0347 moles
m2a = .5 moles    m2b = 1.5 moles
a = 53 g charge   b = 163 g charge

| time | magme | ratio | dm1/dm2 |
|---|---|---|---|
| 155 | 7.420427 | 0.0236 | 0.35396 |
| 160 | 7.641408 | 0.0236 | 0.35391 |
| 165 | 7.862381 | 0.0236 | 0.35389 |
| 179 | 8.083354 | 0.0236 | 0.35389 |
| 175 | 8.304329 | 0.0236 | 0.35389 |

TABLE C

COPOLYMERIZATION CALCULATIONS OF 3%
MOLAR MAGME IN VA

1 = MAGME         2 = VA
r1 = 38.2         r2 = .1
m1a = .023 moles  m1b = .05145 moles
m2a = .5 moles    m2b = 1.5 moles
a = 56 g charge   b = 168 g charge

| time | magme | ratio | dm1/dm2 |
|---|---|---|---|
| 0 | 0.046000 |  | 0.86871 |
| m1a = .023 | m1b = .05145 | | |
| 5 | .4324726 | 0.0456 | 0.84376 |
| 10 | .8558736 | 0.0446 | 0.82044 |
| 15 | 1.270753 | 0.0436 | 0.79870 |
| 20 | 1.677643 | 0.0426 | 0.77845 |
| 25 | 2.077059 | 0.0426 | 0.75963 |
| 30 | 2.4695 | 0.0416 | 0.74217 |
| 35 | 2.855446 | 0.0406 | 0.72601 |
| 40 | 3.235362 | 0.0406 | 0.71109 |
| 45 | 3.609694 | 0.0396 | 0.69735 |
| 50 | 3.978871 | 0.0386 | 0.68472 |
| 55 | 4.343307 | 0.0386 | 0.67316 |
| 60 | 4.703396 | 0.0376 | 0.66261 |
| 65 | 5.059516 | 0.0376 | 0.65302 |
| 70 | 5.412027 | 0.0376 | 0.64433 |
| 75 | 5.761275 | 0.0366 | 0.63650 |
| 80 | 6.107584 | 0.0366 | 0.62947 |
| 85 | 6.451265 | 0.0366 | 0.62320 |
| 90 | 6.792609 | 0.0366 | 0.61764 |
| 95 | 7.131892 | 0.0356 | 0.61274 |
| 100 | 7.469371 | 0.0356 | 0.60847 |
| 105 | 7.805286 | 0.0356 | 0.60477 |
| 110 | 8.13986 | 0.0356 | 0.60160 |
| 115 | 8.473302 | 0.0356 | 0.59893 |
| 120 | 8.805798 | 0.0356 | 0.59670 |
| 125 | 9.137521 | 0.0356 | 0.59488 |
| 130 | 9.468625 | 0.0346 | 0.59343 |
| 135 | 9.799248 | 0.0346 | 0.59230 |
| 140 | 10.12951 | 0.0346 | 0.59145 |
| 145 | 10.45952 | 0.0346 | 0.59084 |
| 150 | 10.78935 | 0.0346 | 0.59044 |
| 155 | 11.11908 | 0.0346 | 0.59020 |
| 160 | 11.44876 | 0.0346 | 0.59008 |
| 165 | 11.77842 | 0.0346 | 0.59004 |
| 170 | 12.10808 | 0.0346 | 0.59004 |
| 175 | 12.43775 | 0.0346 | 0.59004 |

It will be apparent from the above that for obtaining the compositions with the good properties according to the invention the various polymerization reactivities of the various monomers should be taken into account. However, the metering system can be easily adjusted by means of the above calculations.

The polymerication technique as such as well known in the art. Preferably emulsion polymerization in an aqueous medium is used.

The present invention also relates to a process for preparing the novel polymer compositions, said process being characterized in that component a) is added to the polymerization medium in such a way that said component is distributed uniformly over the polymeric backbone. As appears from the above the power feed system is preferred.

Catalytically effective amounts of various free radical forming initiators can be used. In general, these initiators are not critical to the polymerization or performance profile of the composition according to the invention. Examples of initiators are organic or inorganic peroxide or azo compounds. It is also possible to use combinations of reducing and oxidizing agents, e.g. t-butylhydroperoxide sodium metabisulfite.

Especially preferred is the use of inorganic redox systems, e.g. consisting of ammonium, sodium, or potassium persulfate with sodium metabisulfite at a polymerization temperature of 50°-65° C. Persulfate as such may be used at a reaction temperature of 65°-80° C. It will be self-evident that the use of reducing agents such as sodium or zinc formaldehyde sulfoxylate, which can contribute to formaldehyde emission, and azo initiators with low crosslinking performance are not preferred. The levels of peroxide used in the system of the invention are well known to persons skilled in the art of emulsion polymerization and is generally between 0.01 and 1%, preferably 0.05 to 0.5% by wt. of the monomers used.

In the polymerization system various emulsifying agents may be used, e.g. ionic and/or non-ionic surfactants such as sodium laurylsulfate, sulfonated alkyl benzenes, phosphate esters and alkylphenoxy polyethoxy ethanols or polyoxyethylene condensates may be used. Typical emulsifiers, which are well suited in the polymerization system of the invention, include Aerosol ® A-102 (disodium ethoxylated alchol half-ester of sulfosuccinic acid, available from American Cyanamid Company), Aerosol ® A103 (disodium alkylaryl ethoxylated alcohol half-ester of sulfosuccinic acid, available from American Cyanamid Company) with ethoxylated nonylphenol (20–40 mol ethylene oxide) or Aerosol ® A-102/MA 80 mixture.

In addition to or instead of emulsifying agents protective colloids may be used, e.g. polyvinylalchol, hydroxyethylcellulose. Typical buffer systems include soldium bicarbonate or di-ammoniumhydrogenphosphate, or other synthetic colloids.

The amount of surfactant is normally between 0.5-5% , based on the weight of the monomers.

In order to maintain the pH of the reaction medium on a desired value, buffering systems can be employed.

The invention also relates to the use of the novel compositions as binders, coatings or adhesives. Such binders are suitable for use as formaldehyde free crosslinker in textile and non-wovens, paper coatings, diaper cover stock, wipers, towels, and carpetings. In a preferred embodiment the invention relates to a self-crosslinking binder composition as defined in the above, in which the copolymer contains
a) 0.5-10% by wt. of MAGMA,
b) 50-95% by wt. of vinylacetate.

The following examples 1-8 illustrate the present invention. It should be noted that examples 1-8 illustrate a conventional emulsion polymerization process, whereas examples 9-18 illustrate the use of a gradual addition of MAGME ® in such a way, that homopolymerization of MAGME in the water phase or with itself in the growing copolymer chains is overcome (power feed system).

A conventional semi-batch emulsion polymerisation process is employed to make the following latex:

| VA/BA/NMA 86/12/2 weight ratio | |
|---|---|
| | weight/g |
| A. Reactor charge | |
| Deionized water | 110.0 |
| AEROSOL ® A-102 (31%) | 6.7 |
| NaHCO$_3$ (Sodium Bicarbonate) | 1.0 |
| Methanol | 5.0 |
| Ammonium persulfate | 2.0 |
| B. Monomer pre-emulsion | |
| Vinyl Acetae (VA) | 172.0 |
| Butyl Acrylate (BA) | 24.0 |
| AEROSOL ® A-102 (31%) | 6.7 |
| Sodium Metabisulfite | 0.4 |
| Methanol | 5.0 |
| Deionized water | 65.0 |
| C. Delayed portion | |
| N-methylolacrylamide (NMA), 48% | 8.4 |
| Deionized water | 10.0 |

The initial charges were loaded into the reactor, then purged with N$_2$ for 15 minutes while warmed to 65° C. At 65° C., 15 percent of the monomer pre-emulsion was added to the reactor. After initiation (bluish tint), the NMA solution was added to pre-emulsion mix. The remaining pre-emulsion monomer was slowly added into the reactor over a time period of 3 hours. After the addition was completed, the mixture is held at 65° C. for another 1 hour. The resulting latex was cooled to room temperature and filtered into a suitable container.

EXAMPLE 2, 3, 4

Example 1 was repeated except that following were used for the monomer mixture.

| | 1 | 2 | 3 | 4 |
|---|---|---|---|---|
| VA | 172 | 172 | 172 | 172 |
| BA | 24 | 24 | 24 | 24 |
| NMA (48%) | 8.4 | — | 8.4 | — |
| MAGME ® | — | 6.45 | — | 6.45 |
| HEMA | — | — | 4.6 | 4.6 |

EXAMPLE 5, 6, 7, 8

Example 1 was repeated except that following were used for the monomer mixture.

| | 5 | 6 | 7 | 8 |
|---|---|---|---|---|
| VA | 172 | 172 | 172 | 172 |
| BA | 24 | 24 | 24 | 24 |
| NMA (48%) | 16.8 | — | 16.8 | — |
| MAGME ® | — | 12.9 | — | 12.9 |
| HEMA | — | — | 9.2 | 9.2 |

EXAMPLE 9

In this example we use a process which require gradual (power feed) addition of MAGME ® in such a manner to overcome homopolymerisation of MAGME ® in the water phase of with itself in the growing copolymer molecular chains.

Power feed VA/BA/MAGME/HEMA emulsion latex Monomer mixture of Example 8 was repeated except that following process and procedure were used.

| | Weight/g |
|---|---|
| A. Reactor charge | |
| Deionized water | 110.0 |
| AEROSOL ® A-102 (31%) | 6.7 |
| NaHCO3 (Sodium Bicarbonate) | 1.0 |
| Methanol | 5.0 |
| Ammonium persulfate | 2.0 |
| B. Monomer power-feed addition | |
| (1) VA | 86 |
| BA | 12 |
| HEMA | 1 |
| MAGME ® | 2 |
| (2) VA | 86 |
| BA | 12 |
| HEMA | 8.2 |
| MAGME ® | 10.9 |
| Methanol | 5.0 |
| C. Catalyst addition | |
| Deionized water | 75 |
| Sodium Metabisulfite | 0.4 |
| AEROSOL ® A-102 (31%) | 6.7 |

The initial charges were loaded into the reactor then purges with N$_2$ for 15 minutes while warmed to 65° C. At 65° C., 15% of monomer charge B(1) was added into the reactor. After initiation (bluish tint), the remaining monomer B(1) was slowly added to the reactor over a time period of 3 hours, while monomer B(2) was continuously fed into the monomer mix B(1). The catalyst solution was at the same time added in a period of 3 hours. After the additions were completed, the mixture was held at 66° C. for another 1 hour, whereafter the latex was cooled and filtered into a suitable container.

EXAMPLE 10, 11, 12

Example 9 was repeated except that the times for the monomer mixture for B(1) and B(2) are calculated from VA/MAGME reactivity ratio.

$$\frac{d M_1}{d M_2} = \frac{M_1 \times (r_1 M_1 + M_2)}{M_2 \times (r_2 M_2 + M_1)}$$

| | 10 | 11 | 12 |
|---|---|---|---|
| B(1) | | | |
| VA | 43 | 43 | 43 |
| BA | 6 | 6 | 6 |
| MAGME ® | 4 | 2.6 | 1.3 |
| HEMA | 2.5 | 1.6 | 0.8 |
| B(2) | | | |
| VA | 129 | 129 | 129 |
| BA | 18 | 18 | 18 |
| MAGME ® | 8.9 | 6.0 | 3.0 |
| HEMA | 5.7 | 4.6 | 2.3 |

EXAMPLE 13

A latex according to following formulations was made:

| | Example 13 | Example 14 | Example 15 |
|---|---|---|---|
| A. Reactor charge | | | |
| Deionized water | 111.0 | 111.0 | 111.0 |
| FeCl$_3$ 1% | 0.85 | 0.85 | 0.85 |
| Formic Acid | 0.055 | 0.055 | 0.055 |
| AEROSOL ® A-102, 31% | 9.7 | 9.7 | 9.7 |
| Methanol | 5.0 | 5.0 | 5.0 |
| Potassium persulfate | 1.0 | 1.0 | 1.0 |
| Initial monomers | | | |
| VA | 16.0 | 16.0 | 16.0 |
| BA | 2.0 | 2.0 | 2.0 |

-continued

|  | Example 13 | Example 14 | Example 15 |
|---|---|---|---|
| MAGME ® | 0.3 | 0.3 | 0.3 |
| Sodium Metabisulfite | 0.1 | 0.1 | 0.1 |
| Deionized water | 10 | 10 | 10 |
| Power feed - monomer addition | | | |
| B (1) | | | |
| VA | 50 | 50 | 50 |
| BA | 8 | 8 | 8 |
| MAA | 0.6 | 0.6 | 0.6 |
| MAGME ® | 2.0 | 2.6 | 2.0 |
| B (2) | | | |
| VA | 100 | 100 | 100 |
| BA | 16 | 16 | 16 |
| MAA | 1.4 | 1.4 | 1.4 |
| MAGME ® | 5.5 | 5.5 | 5.5 |
| Methanol | 5.0 | 5.0 | 5.0 |
| C) Catalyst addition | | | |
| Deionized water | 65 | 65 | 65 |
| SMBS | 0.5 | 0.5 | 0.5 |
| Sodium Bicarbonate | 0.9 | 0.9 | 0.9 |
| Diammonium hydrogen phosphate | 0.3 | 0.6 | 1.0 |
| AEROSOL ® MA-80 (80%) | 2.5 | 2.5 | 2.5 |

The initial charges were loaded into the reactor then purged with $N_2$ for 15 min. while warmed to 65° C. When the contents of the polymerization kettle reached 60° C., the nitrogen flow was reduced to a minumum and the initial monomer mix plus catalyst for initiation were added to the reactor. After initiation (bluish tint) and maximum exotherm, the additions of monomer and catalyst were started at a rate of 1.5 and 0.4 parts per minute, respectively. Total addition time required was 3 hours. Following completion of the monomer and catalyst addition, the latex was held at 60° C. for 1 hr., then cooled and filtered into a suitable container.

EXAMPLE 16, 17, 18

Example 13 was repeated except that the equal moles of hydroxy ethylmethacrylate monomer was HEMA) included, and following monomer mixtures were used in B(1) and B(2) addition.

|  | Example 16 | Example 17 | Example 18 |
|---|---|---|---|
| B (1) | | | |
| VA | 50 | 50 | 50 |
| BA | 8 | 8 | 8 |
| MAA | 0.6 | 0.6 | 0.6 |
| MAGME ® | 2.0 | 2.0 | 2.0 |
| HEMA | 1.4 | 1.4 | 1.4 |
| B (2) | | | |
| VA | 100 | 100 | 100 |
| BA | 16 | 16 | 16 |
| MAA | 5.5 | 5.5 | 5.5 |
| HEMA | 4.0 | 4.0 | 4.0 |
| Methanol | 5.0 | 5.0 | 5.0 |

EXAMPLE 19

The resulting emulsions of Example 1 to 18 had the following (Table 1, 2 ) physical properties, which are comparable to prior art latex used in industrial applications.

EXAMPLE 20

The emulsions of Example 1 to 18 with or without various postadditives catalyst are drawn on melinex polyester film (100 millimicrons) using a 100 millimicron applicator. The films were air-dried (i.e. at room temperature for 18-24 hrs. , then cured for 3 and 5 minutes at 130° C. in a convected oven.

The cured and uncured films were analyzed for acetone insolubles or solubles (i.e. indicative of the degree of solvent resistant or dry cleaning) and methylethyl ketone (MEK) swell index according to the following procedures.

Procedure of Measurement of Acetone Insoluble Parts of a Film

A catalyzed and/or non-catalyzed film of about 100 micron thickness is laid down on a glass plate and dried at 25° C. for 24 hours.

The film is split into 3 samples of about 1 gram and cured for respectively 0, 3, and 5 minutes at 130° C. whereafter the samples are accurately weighed, chopped into little pieces and refluxed for two hours in 100.0 ml acetone.

After cooling down of the acetone, a folded Whatmann No. 540 filter is placed in the (closed) bottle and the liquid is allowed to filter through.

A 10 ml sample is taken out of the filter, dried at 130° C. and accurately weighed, whereafter the percentage insolubles can be calculated by the formula:

$$I = \frac{F - (S * 10)}{F} * 100\%$$

where:
I=insoluble parts of the film (%)
F=weight of the flim (g)
S=weight of the soluble parts (g)

Procedure Swelling Ratio and Insolubles in MEK

Films of about 100 millimicrons are dried for 24-28 hours. Samples of 2.0×2.0 cm (70-200 mg) are cut from the films, accurately weight (W1) and cured for 0 minutes and minutes at 130° C. After being soaked in MEK for 60 minutes, the samples are dried between a tissue, weighed again in an aluminum dish (W2), dried 30 minutes at 130° C. and finally weighed again (W3).
Swell ratio=W2/W1
% insolubles=W3/W1*100%

Tables 3, 4, 5 provide date on acetone insolubles and MEK swell index plus insolubles for films of Example 1 to 18 emulsions. These results show that emulsion copolymers of vinyl acetate and MAGME prepared according to present invention can be self-crosslinked with comparable results to prior art products, but having advantages of generating no formaldehyde or very small amount i.e. (1-10 ppm).

TABLE 1

EVALUATION OF ALL MAGME/VA LATICES
Latex type of all batches

| Ex. No. | #[a] | Composition[b] VA/BA/MAA/MAGME/HEMA | Conc. M1[c] MAGME/HEMA | Conc. M2[c] MAGME/HEMA | addition[d] type | buffer[e] type |
|---|---|---|---|---|---|---|
| 1 | 100A[f] | 89.9/8.4/—/1.7— | — | — | E | N |
| 2 | 100B | 89.9/8.4/—/1.7/ | — | — | E | N |
| 3 | 104A[f] | 88.5/8.3/—/1.6/1.6 | — | — | E | N |
| 4 | 104B | 88.5/8.3/—/1.6/1.6 | — | — | E | N |
| 5 | 111A[f] | 88.4/8.3/—/3.3/— | — | — | E | N |
| 6 | 111B | 88.4/8.3/—/3.3/— | — | — | E | N |
| 7 | 112A[f] | 85.7/8.0/—/3.2/3.1 | — | — | E | N |
| 8 | 112B | 85.7/8.0/—/3.2/3/1 | — | — | E | N |
| 9 | 123 | 85.7/8.0/—/3.2/3.1 | 1.0/0.7 | 5.2/5.2 | P | N |
| 10 | 126 | 85.7/8.0/—/3.2/3/1 | 3.9/3.8 | 3.0/3.0 | P | N |
| 11 | 134 | 89.4/8.4/—/1.1/1.1 | 1.3/1/1 | 1.0/1.0 | P | N |
| 12 | 135 | 87.5/8.2/—/2.2/2.2 | 2.6/2.1 | 2.0/2.1 | P | N |
| 13 | 146 | 88.1/8.9/1.0/2.0/— | 1.5/— | 2.4/— | P | N, P |
| 14 | 148 | 88.1/8.9/1.0/2.0/— | 1.5/— | 2.4/— | P | N, 2P |
| 15 | 149 | 88.1/8.9/1.0/2.0/— | 1.5/— | 2.4/— | P | N, 3P |
| 16 | 155 | 86.4/8.8/1.0/1.9/1.9 | 1.5/1.4 | 2.3/2.3 | P | N, P |
| 17 | 158 | 86.4/8.8/1.0/1.9/1.9 | 1.5/1.4 | 2.3/2.3 | P | N, 2P |
| 18 | 159 | 86.4/8.8/1.0/1.9/1.9 | 1.5/1.4 | 2.3/2.3 | P | N, 3P |

[a] #100–135: 2 phm Aerosol A102
1 phm AP, 0.2 pHM SMBS
146–159: 1.5 mph Aerosol A102, 0.5 phm Aerosol MA80
0.5 phm KP, 0.3 phm SMBS, FeCl3/formic acid
All batches 51% solids
[b] Molar ratio's of monomers
[c] Molar concentration (%) of MAGME and HEMA in addition
[d] E = pre emulsion type addition
P = power fed solution type addition
[e] N = Sodium bicarbonate
P = Di-ammonium hydrogenphosphate
2P = Di-ammonium hydrogenphosphate, double amount
3P = Di-ammonium hydrogenphosphate, triple amount
[f] Instead of MAGME, NMA is used

TABLE 2

Basic analysis of all batches

| EX: NO | # | Conv. (%) | pH | PS (nm) | Visc. (mPa.s) | Coat (g) | grit 60# (g) | grit 200# % |
|---|---|---|---|---|---|---|---|---|
| 1 | 100A | 95.8 | 4.55 | 218 | 62 | 0.2 | 0.1 | 0.0448 |
| 2 | 100B | 99.2 | 4.36 | 379 | 32.5 | 0.3 | 0.1 | 0.0393 |
| 3 | 104A | 98.9 | 4.52 | 237 | 85.5 | 0.4 | 0.1 | 0.0161 |
| 4 | 104B | 99.6 | 4.33 | 288 | 46 | 0.3 | 0.1 | 0.0158 |
| 5 | 111A | 97.2 | 4.64 | 279 | 82 | 0.5 | 0.2 | 0.0177 |
| 6 | 111B | 97.3 | 4.37 | 299 | 63 | 0.5 | 0.8 | 0.0414 |
| 7 | 112A | 98.2 | 4.63 | 231 | 756 | 0.6 | 0.4 | 0.1015 |
| 8 | 112B | 99.4 | 4.64 | 233 | 132 | 0.4 | 0.2 | 0.0328 |
| 9 | 123 | 94.1 | 4.71 | 325 | 45 | 0.4 | 0.6 | 0.2177 |
| 10 | 126 | 95.8 | 4.70 | 304 | 91 | 0.2 | 0.3 | 0.0448 |
| 11 | 134 | 96.8 | 4.73 | 287 | 33 | 0.3 | 0.4 | 0.0225 |
| 12 | 135 | 98.8 | 4.75 | 260 | 67 | 0.7 | 1.0 | 0.1094 |
| 13 | 146 | 96.3 | 5.45 | 233 | 83 | 1.0 | 0.6 | 0.0350 |
| 14 | 148 | 99.8 | 5.54 | 176 | 394 | 0.3 | 0.4 | 0.1808 |
| 15 | 149 | 96.5 | 5.62 | 261 | 208 | 0.2 | 0.3 | 0.0760 |
| 16 | 155 | 98.8 | 5.40 | 240 | 758 | 0.3 | 0.8 | 0.1246 |
| 17 | 158 | 97.3 | 5.76 | 212 | 258 | 0.6 | 0.9 | 0.2060 |
| 18 | 159 | 97.5 | 5.70 | 174 | 1,476 | 0.4 | 0.3 | 0.1284 |

TABLE 3

Aceton insolubles of all batches:

| EX NO | # | non-cat A/D | non-cat 3'/130° | non-cat 5'/130° | ph3 cat1 A/D | ph3 cat1 3'/130° | ph3 cat1 5'/130° | pISA-cat2 A/D | pISA-cat2 3'/130° | pISA-cat2 5'/130° |
|---|---|---|---|---|---|---|---|---|---|---|
| 1 | 100A | 0 | 1 | 11 | 5 | 44 | 72 | 19 | 78 | 98 |
| 2 | 100B | 0 | 0 | 0 | 0 | 1 | 1 | 3 | 1 | 5 |
| 3 | 104A | 0 | 1 | 24 | 48 | 70 | 85 | 60 | 78 | 85 |
| 4 | 104B | 0.6 | 0.6 | 0.6 | 0 | 0 | 0.8 | 4 | 46 | 60 |
| 5 | 111A | 3 | 0 | 40 | 17 | 34 | 75 | 60 | 77 | 91 |
| 6 | 111B | 4 | 0 | 1 | 2 | 0 | 31 | 8 | 4 | 8 |
| 7 | 112A | 13 | 26 | 28 | 30 | 40 | 63 | 64 | 75 | 82 |
| 8 | 112B | 2 | 0 | 0 | 3 | 2 | 2 | 0 | 25 | 63 |
| 9 | 123 | 0 | 0 | 31 | 1 | 0 | 0 | 10 | 58 | 81 |
| 10 | 126 | 4 | 10 | 65 | 4 | 36 | 57 | 10 | 71 | 81 |
| 11 | 134 | 0 | 0 | 13 | 1 | 7 | 26 | 0 | 83 | 84 |
| 12 | 135 | 0 | 0 | 20 | 0 | 18 | 57 | 16 | 84 | 87 |
| 13 | 146 | 8 | 36 | 18 | 12 | 16 | 34 | 49 | 70 | 86 |
| 14 | 148 | 0 | 2 | 4 | | | | 5 | 77 | 83 |
| 15 | 149 | 48 | 40 | 26 | | | | 34 | 21 | 24 |
| 16 | 155 | 8 | 39 | 41 | | | | 28 | 73 | 76 |
| 17 | 158 | 16 | 29 | 32 | | | | 61 | 75 | 78 |

TABLE 3-continued

| EX | # | Aceton insolubles of all batches: | | | | | | | | |
|---|---|---|---|---|---|---|---|---|---|---|
| | | non-cat | | | ph3 cat[1] | | | pTSA-cat[2] | | |
| NO | | A/D | 3'/130° | 5'/130° | A/D | 3'/130° | 5'/130° | A/D | 3'/130° | 5'/130° |
| 18 | 159 | 16 | 43 | 41 | | | | 0 | 47 | 57 |

1: pH adjusted with phosphoric acid to pH-3
2: 1% pTSA (on latex) added

TABLE 4

| EX | # | MEK Swell of all batches: | | | |
|---|---|---|---|---|---|
| | | non-cat | | ptsa-cat[1] | |
| NO | | A/D | 5'/130° | A/D | 5'/130° |
| 1 | 100A | x | 13.0 | 6.5 | 4.0 |
| 2 | 100B | x | x | x | 9.8 |
| 3 | 104A | x | 7.0 | 4.5 | 3.2 |
| 4 | 104B | x | x | x | 7.4 |
| 5 | 111A | 7.4 | 9.4 | 3.4 | 2.4 |
| 6 | 111B | x | x | x | 15.6 |
| 7 | 112A | 5.7 | 5.7 | 2.2 | 2.1 |
| 8 | 112B | x | x | x | 4 |
| 9 | 123 | x | x | 8.6 | 4.3 |
| 10 | 126 | 13.2 | 8.1 | 11.6 | 5.2 |
| 11 | 134 | x | x | x | 8.9 |
| 12 | 135 | 10.7 | 38.1 | 29 | 4.1 |
| 13 | 146 | 27.2 | 31.1 | 21.3 | 9.5 |
| 14 | 148 | 9.7 | 4.4 | 27 | 7.38 |
| 15 | 149 | 7.9 | 37.7 | 26.7 | 24 |
| 16 | 155 | 20 | 12 | 12 | 3.1 |
| 17 | 158 | 40 | 16 | 15 | 4.1 |
| 18 | 159 | 21.5 | 15 | 13 | 6.6 |

[1]1% pTSA (on latex) added

TABLE 5

| EX | # | MEK Insolubles of all batches: | | | |
|---|---|---|---|---|---|
| | | non-cat | | ptsa-cat[1] | |
| NO | | A/D | 5'/130° | A/D | 5'/130° |
| 1 | 100A | 0 | 73 | 81 | 89 |
| 2 | 100B | 0 | 0 | 0 | 55 |
| 3 | 104A | 0 | 75 | 85 | 90 |
| 4 | 104B | 0 | 0 | 0 | 82 |
| 5 | 111A | 26 | 58 | 66 | 91 |
| 6 | 111B | 0 | 0 | 0 | 47 |
| 7 | 112A | 34 | 54 | 71 | 88 |
| 8 | 112B | 0 | 0 | 0 | 87 |
| 9 | 123 | 0 | 0 | 53 | 86 |
| 10 | 126 | 46 | 80 | 68 | 93 |
| 11 | 134 | 0 | 0 | 0 | 86 |
| 12 | 135 | 62 | 59 | 30 | 90 |
| 13 | 146 | 63 | 78 | 43 | 73 |
| 14 | 148 | 96 | 27 | 43 | 68 |
| 15 | 149 | 75 | 86 | 72 | 84 |
| 16 | 155 | 39 | 52 | 44 | 80 |
| 17 | 158 | 47 | 42 | 30 | 82 |
| 18 | 159 | 38 | 51 | 42 | 67 |

[1]1% pTSA (on latex) added

We claim:
1. A process for preparing a polymer composition comprising an emulsion copolymer of
(a) 0.1-25% by wt. of an alkyl acrylamido-glycolate alkylether having the formula

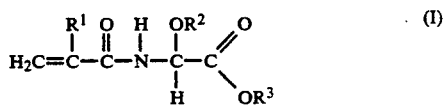

wherein $R^1$ is hydrogen or methyl, $R^2$ and $R^3$ are independently selected from $C_1$-$C_6$ alkyl and $C_5$-$C_6$ cycloalkyl;
(b) 50-95% by wt. of vinylacetate;
(c) 0.1-25% by wt. of one or more hydroxy functional containing monomer;
(d) 0-50% by wt. of another vinyl monomer, the amount of the components (a)-(d) being calculated on the weight of the total composition;
characterized in that component a) is added to the polymerization medium by power feed addition so that said component as is distributed uniformly over the polymeric backbone.
2. A process according to claim 1, wherein component a) is methlacrylamidoglycolate methyl ether.
3. A process according to claim 1, wherein component c) is selected from the group consisting of 2-hydroxyethylacrylate; hydroxyethylmethacrylate; polyvinyl alcohol; cellulosic compounds and mixtures thereof.
4. A process according to claim 1, wherein component d) is selected from the group consisting of butyl acrylate; methyl methacrylate; dibutyl maleate; vinyl chloride; vinylidene chloride; butadiene; ethylene, propylene and mixtures thereof.
5. A process according to claim 1, wherein a) is methylacrylamidoglycolate methyl ether; c) is 2-hydroxyethylacrylate; hydroxyethylmethacrylate; polyvinyl alcohol; cellulosic compounds and mixtures thereof; and d) is butyl acrylate; methyl methacrylate; dibutyl maleate; vinyl chloride; vinylidene chloride; butadiene; ethylene, propylene and mixtures thereof.

* * * * *